United States Patent [19]
Howard

[11] 3,747,097
[45] July 17, 1973

[54] RADAR TARGET IMAGING TECHNIQUE

[75] Inventor: Dean D. Howard, Oxon Hill, Md.

[73] Assignee: The United States of America as represented by the Secretary of the Navy, Washington, D.C.

[22] Filed: Feb. 24, 1971

[21] Appl. No.: 118,541

[52] U.S. Cl. ............ 343/11 R, 343/16 M, 343/17
[51] Int. Cl. ............................................ G01s 7/10
[58] Field of Search ................. 343/11 R, 16 M, 17

[56] References Cited
UNITED STATES PATENTS
3,134,974  5/1964  Orenstein ..................... 343/11 R
2,716,234  8/1955  Lester et al. .................. 343/11 R
3,594,800  7/1971  Stoney ....................... 343/16 M X
3,273,148  9/1966  Wood et al. ................... 343/17 X
3,200,398  8/1965  Witt .......................... 343/11 R Primary Examiner—Malcolm F. Hubler
Attorney—R. S. Sciascia, Arthur L. Branning and Philip Schneider

[57] ABSTRACT

A radar which utilizes high resolution range techniques to obtain an indicator of the target that approaches a visual image presentation having more than one dimension. Specifically, the invention utilizes the radar high resolution range video return to control the input of a CRO, the Y location on the CRO trace being highly resolved range and the X location being bipolar azimuth video. This technique greatly enhances the radar's ability to avoid scintillation.

8 Claims, 5 Drawing Figures

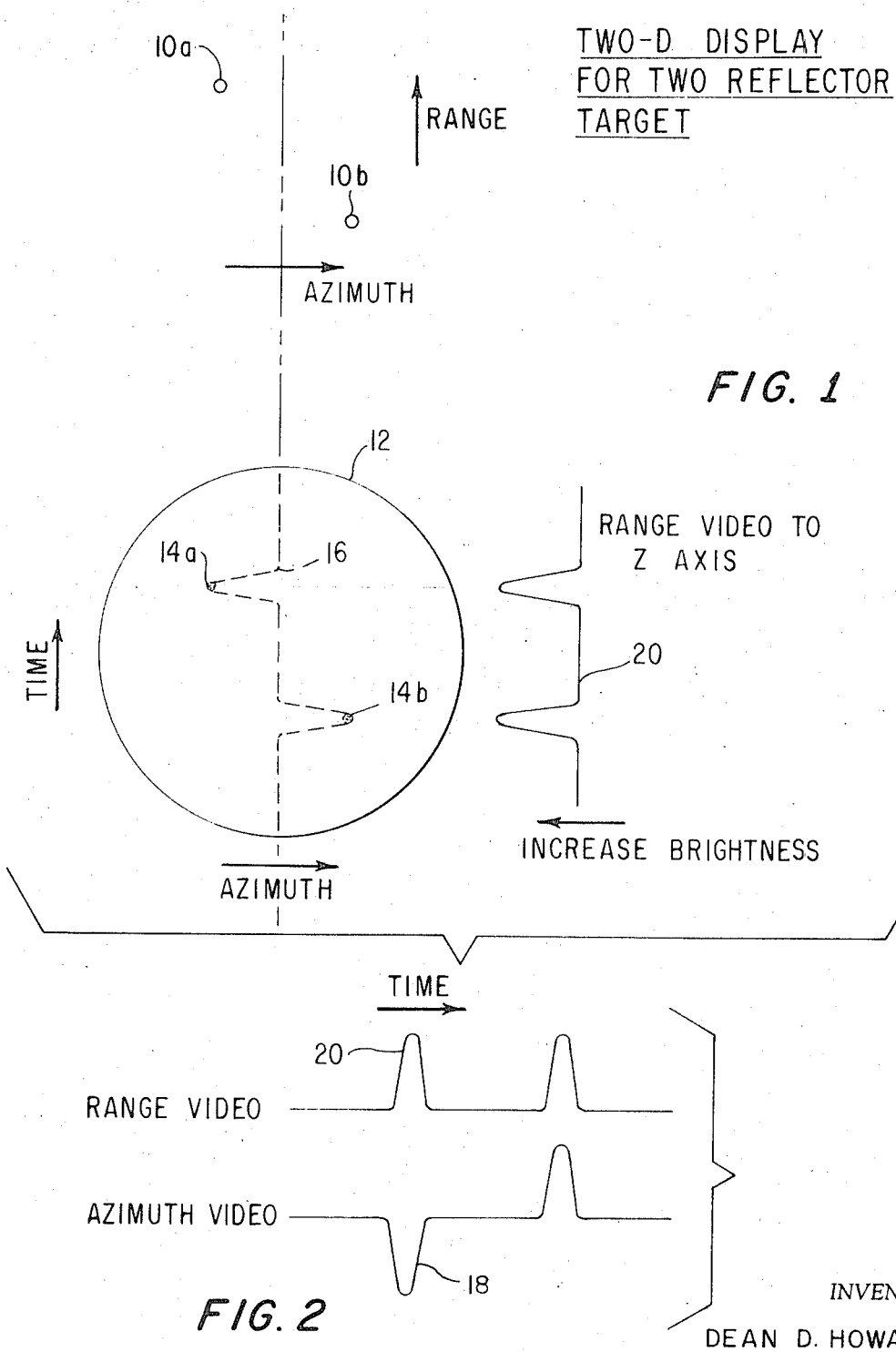

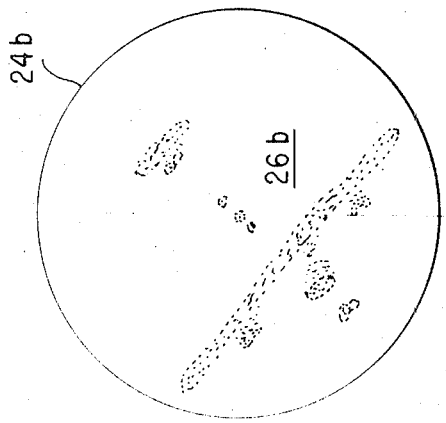
*FIG.3B*
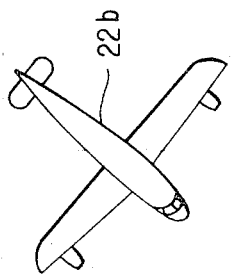
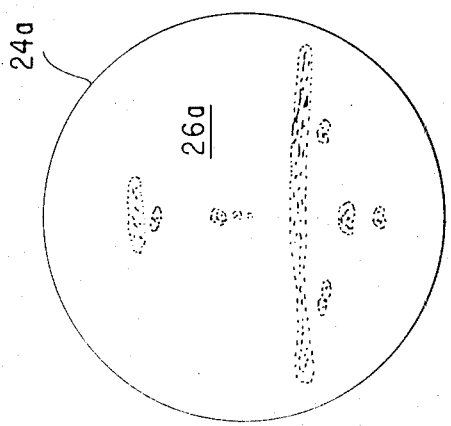
*FIG. 3A*
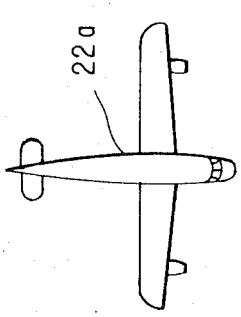
INVENTOR
DEAN D. HOWARD
BY  ATTORNEY

INVENTOR
DEAN D. HOWARD

RADAR TARGET IMAGING TECHNIQUE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Conventional techniques for providing one or more dimensional presentation of targets use, in addition to high range resolution, some means for obtaining high angular resolution to resolve parts of a target in angle as well as range. This requires either a very large real aperture (antenna) or a synthetic aperture. The conventional approach requires coherence over the full aperture which increases in difficulty with aperture size limiting, the maximum size and angular resolution capability.

The large real aperture (antenna) requires a very large antenna which greatly increases the cost of the related equipment and limits the applicability to radar sites which can house such a large antenna, thereby greatly limiting the application of high angular accuracy for airborne tracking, while the synthetic aperture high angular resolution requires expensive and bulky data processing equipment and processing time.

SUMMARY OF THE INVENTION

The general purpose of this invention is to provide a tracking radar which provides the precise location in angle of parts of the target resolved by high range resolution techniques while presenting none of the aforesaid disadvantages of high angular resolution techniques. This is accomplished by using a wide bandwidth monopulse tracking system maintaining wide bandwidth in the angle error detector output. The range detector output consists of pulses with amplitude proportional to echo amplitude and position proportional to the range of the targets. The angle information from a wide band monopulse system provides Bipolar video (positive and negative pulses) of amplitude proportional to and of a polarity corresponding to the angular placement of a target. The radar CRT fast sweep is initiated by a trigger from the range tracker just before the target echo is expected. As the beam sweeps in range across the CRT the angular bipolar video information drives the other deflection axis, while the range video causes the trace to brighten only when the echo is received, with a brightness proportional to the echo amplitude. Thus the presentation or display forms a two dimensional image of the target.

The two dimensional display aids in target recognition and classification by greatly enhancing detection of decoys and false targets; this display would also help in recognition of countermeasures activities by the target or other locations and allow for avoidance of this activity.

OBJECTS OF THE INVENTION

It is therefore, an object of the invention to provide an improved tracking radar.

Another object is to provide a tracking radar which is capable of providing a one or more dimensional presentation.

Yet another object of the invention is a tracking radar which provides a means for reducing target scintillation.

A still further object of this invention is a tracking radar which is compact, while providing high range resolution and precise angular location of each resolved part of the target by use of a wide bandwidth radar system.

DESCRIPTION OF THE DRAWINGS

FIGS. 1 and 2 show a display of a two reflector target using the concepts of the invention.

FIGS. 3A and 3B show approximately how an aircraft would appear on a two-dimensional scope display.

DESCRIPTION OF THE PREFERRED EMBODIMENT

Figure 4:
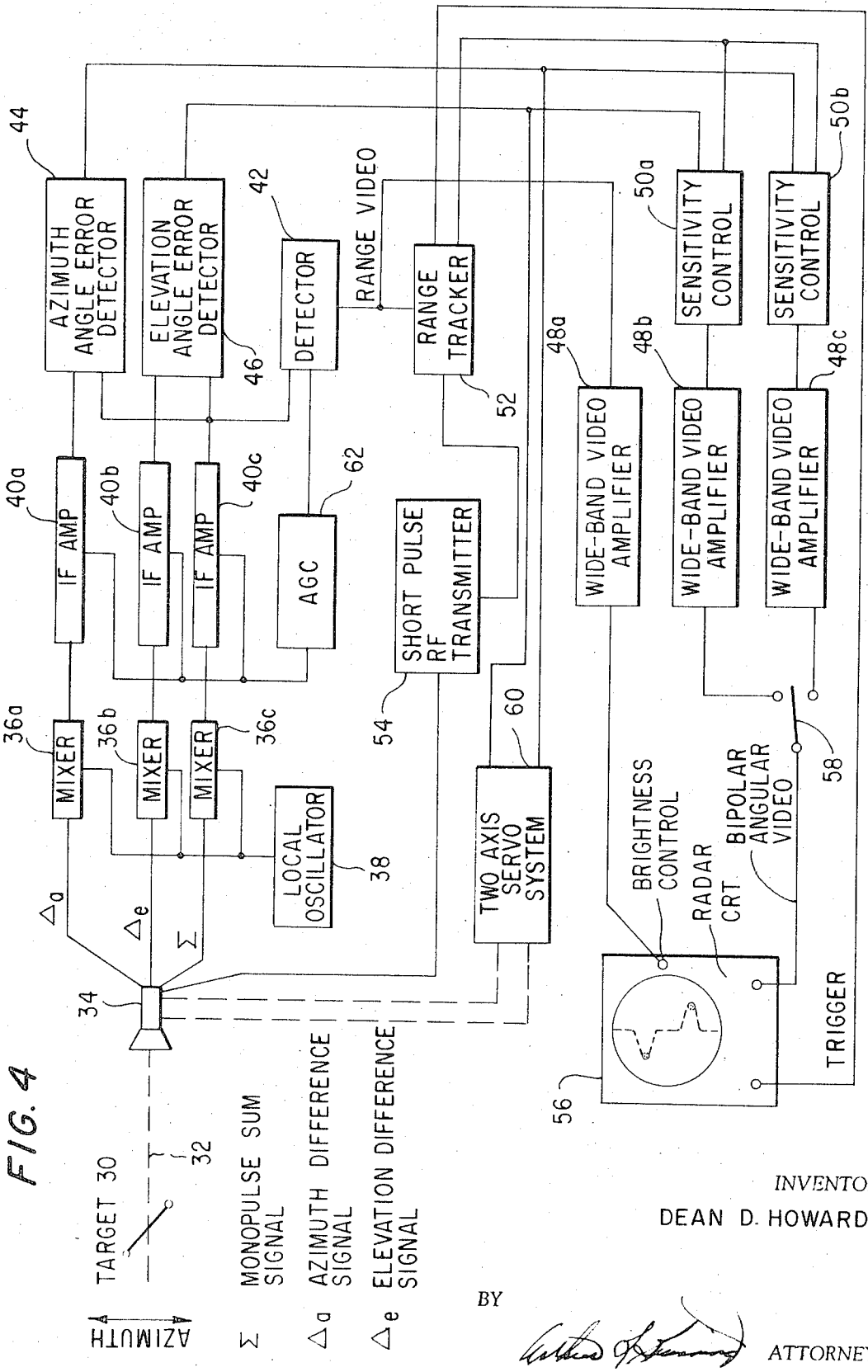
FIG. 4 shows a preferred embodiment of the invention using a two reflector target.

Before processing with a description of the present invention, it is considered advisable to discuss some basic concepts of tracking radars. Tracking radars are used principally for continuously measuring the relative position of a target in range, azimuth angle and elevation angle. These radars typically consist of an antenna, which radiates a pencil-beam, from a rotating platfrom which is controlled in azimuth and elevation position by angular error signals which cause the antenna to change position keeping the target centered in the beam. These radars would typically employ a display which shows the target as a point source of brightness on a CRT usually indicating the range; range and azimuth; or range, azimuth, and elevation of the target depending on the type of display.

The accurate tracking of a target, unless highly resolved range and highly resolved angular position are employed, is complicated by angle noise (also called glint or scintillation), which causes the angular location of an apparent source to wander back and forth about the physical center of the target, due to echo signal from a complex target being dependent upon the relative phase and amplitude of the component echo signals and their relative angular locations.

The present invention employs highly resolved range and wide bandwidth angle error information such that each part of the target resolved by the high resolution range system can be located precisely in angle. Referring to FIGS. 1 and 2, FIG. 1 shows a two reflector target 10a–b being displayed on CRT 12 and shown as brightened spots 14a–b. The CRT trace 16, applied to the vertical deflection plates, shown as a dotted line sweeps with increasing time which is proportional to range, while the angular azimuth video 18, of FIG. 2, applied to the horizontal deflection plates, deflects the trace by an amount proportional to the targets azimuth angular position in relation to the bore sight of the antenna. The trace is normally blanked and maintained at a very low brightness. This brightness is intensified by the range video indicating the presence of a target at the same time the trace is being deflected horizontally by the azimuth video. Thus the target 10a–b would appear as two brightened spots indicating the precise range and angular location of the two reflector portions of the target. An ordinary tracking radar would display such a two reflector target as single spot on the CRT causing problems with angular noise and making accurate tracking difficult.

FIG. 2 shows the nature of the range video 20 and the azimuth video 18. Note that the range video is unipolar while the azimuth video is bipolar.

FIGS. 3A and B show approximately how the image 26a–b of aircraft 22a–b would appear on CRT scopes 24a–b.

Referring now to the preferred embodiment of the invention, FIG. 4, the two reflector target 30 being aligned with a reflector located on either side of the antenna bore sight line 32. The monopulse antenna 34 receives the reflected information and separates this information into a sum signal Σ, an elevation difference signal Δe and an azimuth difference signal Δa. These three received signals are fed to mixers 36a, b and c where the signals are mixed with the signal from the local oscillator 38. The mixer output signals are supplied to IF amplifiers 40a, b, c, and then to the signal detectors. The sum signal from IF amplifier 40c is connected to an amplitude detector 42 and to both the azimuth angle error detector 44 and elevation angle error detector 46 along with the respective angular difference signals. The angle error detectors 44,46 may be phase sensitive detectors which give a bipolar video output the amplitude of which is indicative of the angular position of the portions of the target respective to the antenna bore sight. The difference outputs from detector 44 and 46 are coupled to wideband video amplifiers 48b and 48c through sensitivity controls 50a–b. The range video from detector 42 is coupled to a range tracker 52 which also receives a pulse from the short pulse rf transmitter 54. The range tracker 52 generates a trigger pulse used to trigger the radar CRT 56 fast sweep when a target echo is expected. The range tracker 52 also generates a control voltage which is proportional to the target range such that the sensitivity controls 50a–b can maintain a uniform sensitivity for targets of different range. The range video is coupled to a wide band video amplifier 48a the output of which is coupled to the Z axis or brightness control of the radar CRT 56 while the bipolar angular video is supplied to the horizontal deflection plates of the CRT 56 through selector switch 58 from either the azimuth video amplifier 48c or the elevation video amplifier 48b depending on the type of angle error information needed to provide the desired display. The transmitter 54 is of course coupled to the antenna 34 to provide the short pulse of rf energy, while two axis servo system 60, controls the antenna 34 by using the angle error information desired from the error detectors 44 and 46; and the AGC 62 controls the gain of the IF amplifiers 40 by using the output of the detector 42.

The general operation is as follows: the range tracker 52 is triggered by the transmitter 54 when the transmitter supplies a pulse to the antenna 34. This pulse is reflected by the target 30 and received by the antenna 34. The antenna separates the received signal into a sum signal, an azimuth difference signal and an elevation difference signal. These azimuth and elevation difference signals are compared with the sum signal in detectors 44 and 46 to develop azimuth and elevation bipolar angle video which is coupled to the CRT 56, while the range video is detected and supplied to the brightness control of the CRT 56. At a time just prior to the receipt of an echo the range tracker 52 generates a pulse which causes the CRT 56 to initiate a fast sweep which is deflected by the bipolar angle video and intensified by the range video thereby showing the precise location in angle and range of each part of the target (i.e. thereby presenting a two-dimensional display of the target).

The two dimensional display aids in target recognition and classification by greatly enhancing detection of decoys and false targets; this display would also help in recognition of countermeasures activities by the target or other locations and allow for avoidance of this activity.

Generally the system would employ azimuth bipolar video rather than elevation bipolar unless it became necessary to resolve a target in elevation such as the reflected image, from the earth's surface, of a low flying aircraft.

Further it is envisioned that a three-dimensional display could be constructed by using both the elevation and azimuth bipolar video and the range video.

The present invention employs a 3 nanosecond pulse and high range resolution on the order of 1.5 feet.

Obviously many modifications and variations of the present invention are possible in the light of the above teachings. It is therefore to be understood that within the scope of the appended claims, the invention may be practiced otherwise than as specifically described.

What is claimed and desired to be secured by Letters Patent of the United States is:

1. A two-dimensional radar system for use in target tracking which comprises:
    antenna means functioning to provide, first and second signals, said first signal being indicative of target range and said second signal being indicative of target angular error from said antenna bore sight;
    display means which provides a fast sweep in time along a first axis;
    sensitivity means coupled to said second signal operative to control the amplitude of said second signal in response to range information;
    said second signal being coupled to said display means to cause said fast sweep in time to be deflected in a second axis by an amount proportional to the angular error of said target;
    said first signal being coupled to said display means to cause a conditional change in said fast sweep which is indicative of said target range;
    whereby a two-dimensional display is formed such that each part of said target is located in range and angle.

2. The two-dimensional radar system of claim 1 wherein said display means comprises a cathode ray tube.

3. The two-dimensional radar system of claim 1 wherein said range information is provided by a range tracker which is coupled to said first signal.

4. A two-dimensional radar system for use in target tracking which comprises:
    a monopulse antenna which provides first, second, and third output signals, said first signal being the sum output, said second signal being the azimuth difference output, and said third signal being the elevation difference output;
    display means for providing a fast sweep along a first axis, said sweep being proportional to target range;
    said second signal of said antenna being coupled to said display means;
    said second signal causing said sweep, along said first axis, to be deflected in a second axis to locate the angular position of said taget;

said first signal of said antenna being coupled to said display means;

said first signal causing said sweep to give an indication of the range position of said target;

whereby a two-dimensional display is formed such that each part of said target is located in range and angle.

5. The two-dimensional radar system of claim 4 wherein said display means comprises a cathode ray tube.

6. The two-dimensional radar system of claim 4 wherein sensitivity means coupled to said second signal operates to control the amplitude of said second signal in response to range information.

7. The two-dimensional radar system of claim 6 wherein said range information is provided by a range tracker which is coupled to first signal.

8. The two-dimensional radar system of claim 3 wherein said third signal of said antenna is coupled to said display means;

said third signal causing said sweep to be deflected in a second axis to locate the angular position of said target.

* * * * *